(12) United States Patent
Du

(10) Patent No.: US 8,345,985 B2
(45) Date of Patent: Jan. 1, 2013

(54) ELECTRONIC DEVICE AND METHOD FOR MATCHING IMAGES

(75) Inventor: Yao-Hong Du, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 174 days.

(21) Appl. No.: 12/913,777

(22) Filed: Oct. 28, 2010

(65) Prior Publication Data

US 2012/0045130 A1 Feb. 23, 2012

(30) Foreign Application Priority Data

Aug. 17, 2010 (CN) .......................... 2010 1 0255507

(51) Int. Cl.
*G06K 9/46* (2006.01)
(52) U.S. Cl. ...................................................... 382/190
(58) Field of Classification Search .................. 382/181, 382/190
See application file for complete search history.

(56) References Cited

U.S. PATENT DOCUMENTS

| | | | | |
|---|---|---|---|---|
| 4,574,393 | A * | 3/1986 | Blackwell et al. | 382/162 |
| 8,014,601 | B2 * | 9/2011 | Takahashi | 382/168 |
| 2006/0285754 | A1 * | 12/2006 | Steinberg et al. | 382/224 |

* cited by examiner

*Primary Examiner* — Claire X Wang
*Assistant Examiner* — Amandeep Saini
(74) *Attorney, Agent, or Firm* — Altis Law Group, Inc.

(57) ABSTRACT

In an electronic device and method of matching an image A and an image B, grayscale centers of the image A and the image B are computed. The image A is divided into n equal parts $D_{k(k=1 \sim n)}$ according to the grayscale center, and a grayscale density $V_k$ of each part $D_k$ is computed, to acquire n grayscale densities $V_{k(k=1 \sim n)}$ which are regarded as feature data u of the image A. Feature data v of the image B is extracted in the similar way. A similarity of a grayscale density $V_{ak}$ selected from the feature data u and the grayscale density $V_{bk}$ selected from the feature data V, is computed. Thus, n similarities are computed. A similarity $\beta(n, u, v)$ of the image A and the image B is computed according to the n similarities.

13 Claims, 5 Drawing Sheets

ELECTRONIC DEVICE AND METHOD FOR MATCHING IMAGES

BACKGROUND

1. Technical Field

Embodiments of the present disclosure generally relate to image searching, and more particularly to a method for matching images according to feature data thereof and an electronic device implementing the method.

2. Description of Related Art

Conventional Web search engines such as GOOGLE, YAHOO and MSN provide image search services. The provided search services implement an inquiry function by creating indices based primarily on filenames of images and is therefore similar to textual keyword search or a keyword search based on a filename. Although this filename-based searching method may satisfy typical search demands, it nevertheless often fails to provide actual searching based on image content.

DETAILED DESCRIPTION

The application, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module" as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may be comprised of connected logic units, such as gates and flip-flops, and may be comprised of programmable units, such as programmable gate arrays or processors. The modules described herein may be implemented as either software and/or hardware modules and may be stored in any type of computer-readable medium or other computer storage device.

Figure 1:
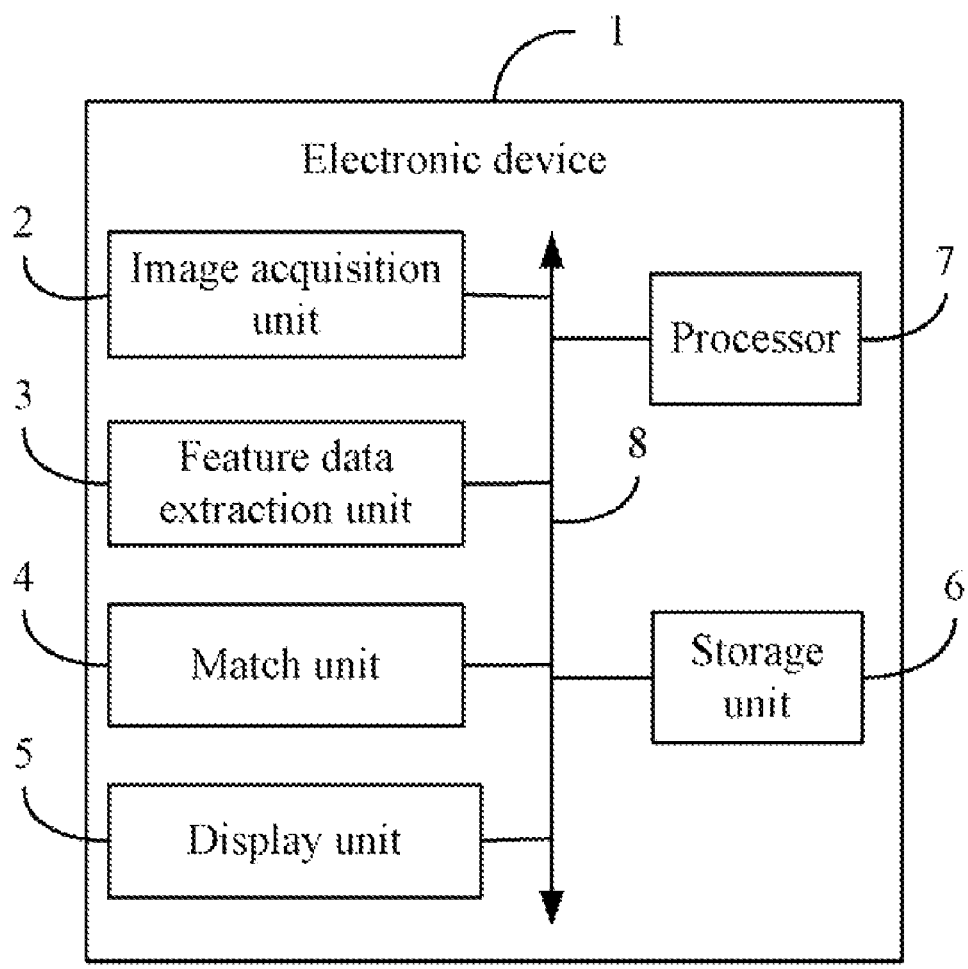
FIG. 1 is a block diagram of an electronic device, according to some embodiments of the present disclosure.

FIG. 1 is a block diagram of an electronic device 1, according to some embodiments of the present disclosure. The electronic device 1 includes an image acquisition unit 2, a feature data extraction unit 3, a match unit 4, a display unit 5, a storage unit 6, and a processor 7. These units 2-4, the display unit 5, the storage unit 6, and the processor 7 electronically communicate over one or more communication buses or signal lines 8. The electronic device 1 can be any electronic device, including but not limited to a computer, a server, or a mobile phone, for example. It should be appreciated that the electronic device 1 may have more or fewer components than shown in FIG. 1, or a different configuration of components. The various components shown in FIG. 1 may be implemented in hardware, software or a combination thereof, including one or more signal processing and/or application specific integrated circuit.

The image acquisition unit 2 acquires images. The image acquisition unit 2 may be a hardware component (e.g., a camera component) that can capture images of animals, people, objects, and scenes, for example, or may be a software application that downloads images from the Internet or any storage medium, such as the storage unit 6.

Figure 2:
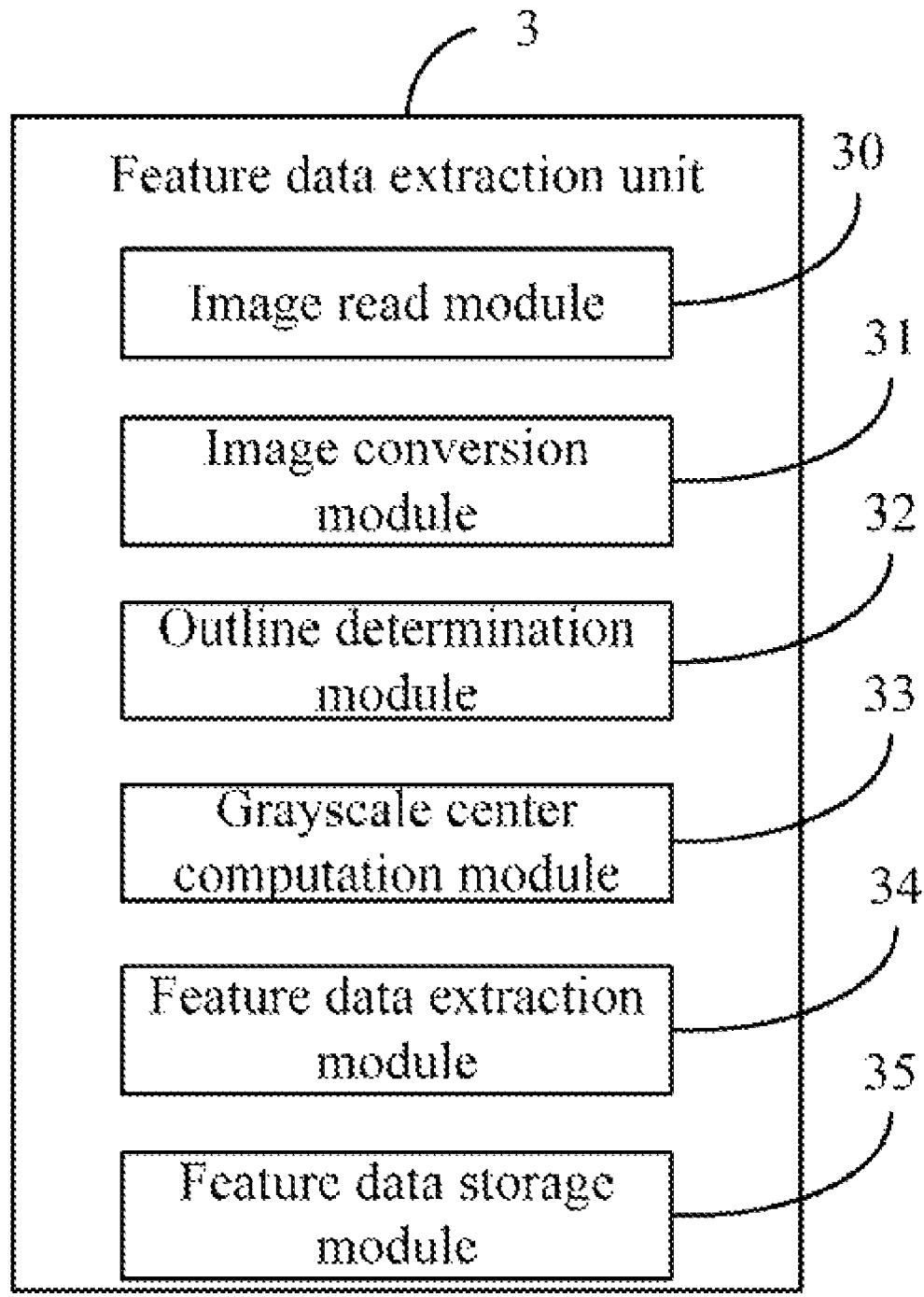
FIG. 2 is a block diagram illustrating function modules of a feature data extraction unit included in the electronic device of FIG. 1, according to some embodiments of the present disclosure.

The feature data extraction unit 3 includes a plurality of function modules, as detailed in FIG. 2, to extract feature data of the images acquired by the image acquisition unit 2.

Figure 3:
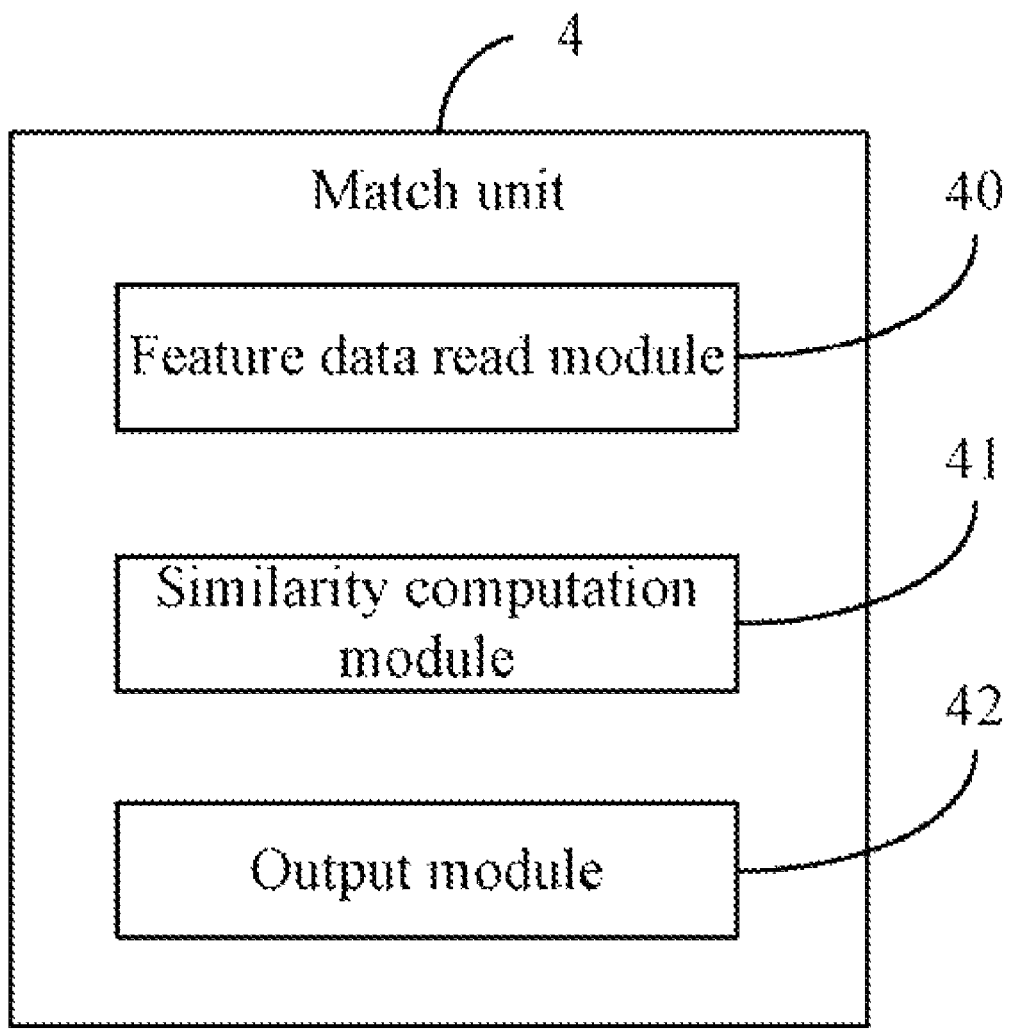
FIG. 3 is a block diagram illustrating function modules of a match unit included in the electronic device of FIG. 1, according to some embodiments of the present disclosure.

The match unit 4 includes a plurality of function modules, as detailed in FIG. 3, to match images by computing a similarity of the images according to the feature data of the images, and output the similarity of the images on the display unit 5.

The function modules of the feature data extraction unit 3 and the match unit 4 may comprise one or more computerized codes in the form of one or more programs that are stored in the storage unit 6. The storage unit 6 may include high speed random access memory and may also include non-volatile memory, such as one or more magnetic disk storage devices, flash memory devices, or other non-volatile solid state memory devices. The one or more computerized codes of the feature data extraction unit 3 and the match unit 4 includes instructions executed by the processor 7, to provide functions for the function modules of the feature data extraction unit 3 and the match unit 4.

FIG. 2 is a block diagram illustrating the function modules of the feature data extraction unit 3 of FIG. 1, which include an image read module 30, an image conversion module 31, an outline determination module 32, a grayscale center computation module 33, a feature data extraction module 34, and a feature data storage module 35.

The image read module 30 reads an image A from the image acquisition unit 2. The image A may be a color image or a grayscale image.

The image conversion module 31 converts the image A into a grayscale image if the image A is a color image.

The outline determination module 32 determines outlines of the grayscale image to generate an outline image. In some embodiments, the determination of the outline may adopt the Canny edge detection algorithm. Generation of the outline image reduces subsequent computational work.

The grayscale center computation module 33 computes a grayscale center of the outline image. The grayscale center is a mean location of all the gray values in the outline image. The grayscale center $(r_0, c_0)$ is computed by following formula:

$$r_0 = \frac{\sum i \times g_{ij}}{\sum g_{ij}}$$

$$c_0 = \frac{\sum j \times g_{ij}}{\sum g_{ij}},$$

where i represents each row of the outline image, j represents each column of the outline image, and $g_{ij}$ represents a gray value of the point (i, j) in the outline image.

The feature data extraction module 34 divides the outline image into n equal parts $D_{k(k=1\sim n)}$ according to the grayscale center, computes a grayscale density $V_k$ of each part $D_k$, thus to acquire n grayscale densities $V_{k(k=1\sim n)}$, where n is a positive integer. The grayscale density $V_k$ of the part $D_k$ is computed as follows:

$$V_k = \frac{\sum r_{i'j'} \times g_{i'j'}}{\sum r_{ij} \times g_{ij}},$$

where (i' j') is a point in the part $D_k$, (i, j) is a point in the outline image, $r_{i'j'}$ represents a distance between the point (i', j') and the grayscale center($r_0$, $c_0$), $r_{ij}$ represents a distance between the point (i, j) and the grayscale center($r_0$,$c_0$), $g_{i'j'}$ represents a gray value of the point (i', j'), and $g_{ij}$ represents a gray value of the point (i, j). It may be appreciated that the n grayscale densities $V_{k(k=1\sim n)}$ are regarded as feature data of the image A.

The feature data storage module 35 stores the feature data of the image A into the storage unit 6.

It may be appreciated that the feature data extraction unit 3 further extracts feature data of any other image, such as feature data of an image B, feature data of an image C, and so on, using the function modules 30~35.

FIG. 3 is a block diagram illustrating the function modules of the match unit 4 of FIG. 1, which include a feature data read module 40, a similarity computation module 41, and an output module 42.

The feature data read module 40 reads feature data u of the image A and reads feature data v of the image B from the storage unit 6. Both the feature data u and the feature data v include n grayscale densities. That is, the feature data u includes grayscale densities $V_{ak(k=1\sim n)}$, and the feature data v includes grayscale densities $V_{bk(k=1\sim n)}$.

The similarity computation module 41 selects a grayscale density $V_{ak}$ from the feature data u, selects a grayscale density $V_{bk}$ from the feature data v, and computes a similarity γ ($V_{ak}$, $V_{bk}$) of the grayscale density $V_{ak}$ and the grayscale density $V_{bk}$ using a first formula, for example:

$$\gamma(V_{ak}, V_{bk}) = 100 - |V_{ak} - V_{bk}| \div ((V_{ak} + V_{bk}) \div 2) * 100.$$

It may be appreciated that, n similarities γ ($V_{ak(k=1\sim n)}$, $V_{bk(k=1\sim n)}$), namely γ ($V_{a1}$, $V_{b1}$), γ ($V_{a2}$, $V_{b2}$), γ ($V_{a3}$, $V_{b3}$) . . . γ ($V_{an}$, $V_{bn}$), need to be computed, because the feature data u includes n grayscale densities $V_{ak(k=1\sim n)}$ and the feature data v includes n grayscale densities $V_{bk(k=1\sim n)}$. The similarity computation module 41 further computes a similarity β (n, u, v) of the image A and the image B according to the n similarities γ ($V_{ak(k=1\sim n)}$, $V_{bk(k=1\sim n)}$) using a second formula, for example:

$$\beta(n, u, v) = [\Sigma\gamma(V_{ak}, V_{bk})] \div n.$$

The output module 42 outputs the similarity β (n, u, v) of the image A and the image B on the display unit 5.

Figure 4:
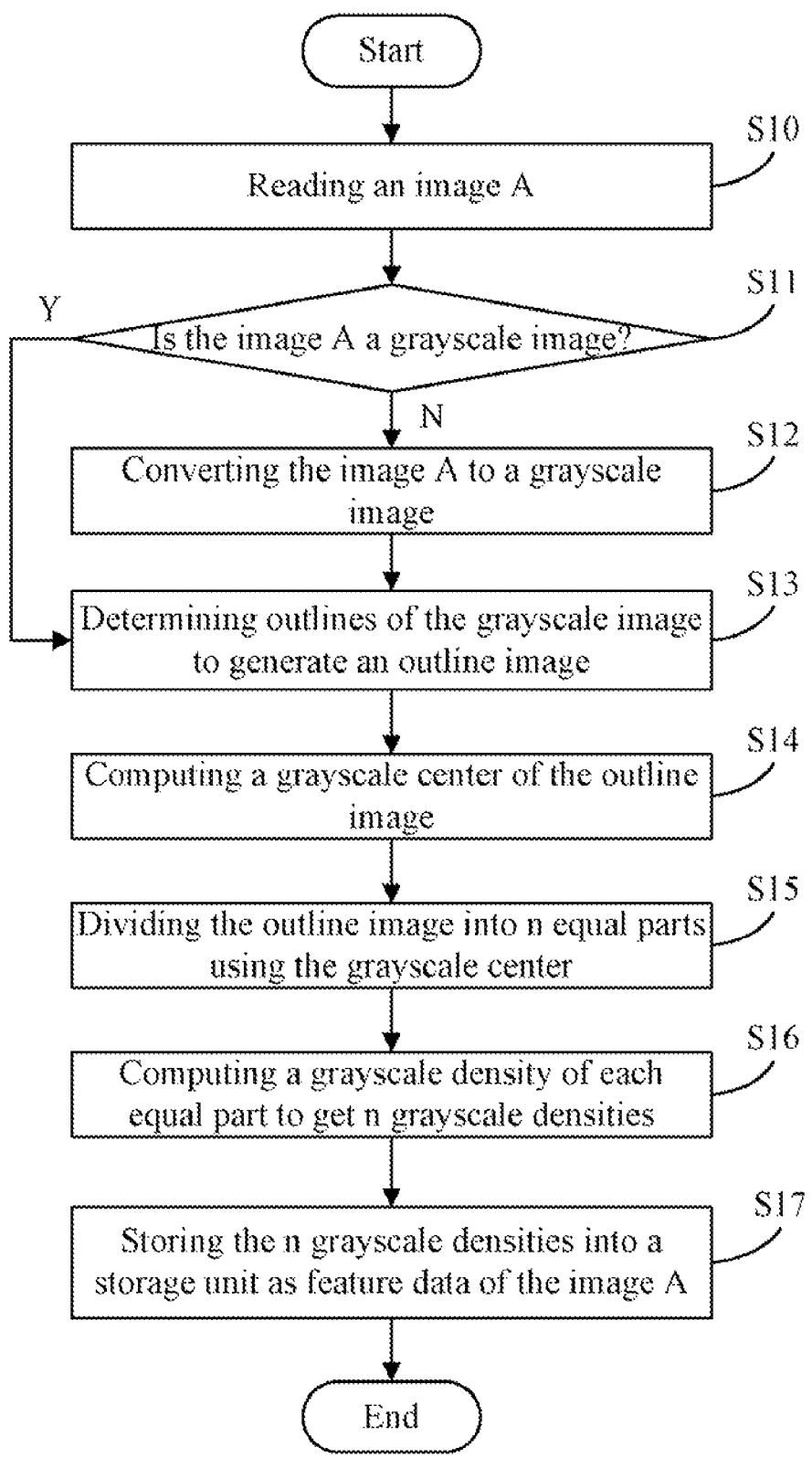
FIG. 4 is a flowchart of a method of extracting feature data of an image, according to some embodiments of the present disclosure.

FIG. 4 is a flowchart of a method of extracting feature data of an image performed by the processor 7 of the electronic device of FIG. 1, according to some embodiments of the present disclosure. Depending on the embodiment, additional blocks in the flow of FIG. 3 may be added, others removed, and the ordering of the blocks may be changed.

In block S10, the image read module 30 reads an image A from the image acquisition unit 2 of the electronic device 1. The image A may be color or grayscale image.

In block S11, the image conversion module 31 determines if the image A is a grayscale image. Block S12 is implemented if the image A is not a grayscale image, but a color image. Otherwise, block S13 is directly implemented if the image A is a grayscale image.

In block S12, the image conversion module 31 converts the image A into a grayscale image.

In block S13, the outline determination module 32 determines outlines of the grayscale image to generate an outline image. In some embodiments, the determination of the outlines may adopt the Canny edge detection algorithm.

In block S14, the grayscale center computation module 33 computes a grayscale center of the outline image. The grayscale center is a mean location of all the gray values in the outline image. The grayscale center ($r_0$, $c_0$) is computed by the following formulae:

$$r_0 = \frac{\sum i \times g_{ij}}{\sum g_{ij}}$$

$$c_0 = \frac{\sum j \times g_{ij}}{\sum g_{ij}},$$

where i represents each row of the outline image, j represents each column of the outline image, and $g_{ij}$ represents a gray value of the point (i, j) in the outline image.

In block S15, the feature data extraction module 34 divides the outline image into n equal parts $D_{k(k=1\sim n)}$ according to the grayscale center, and in block S16, the feature data extraction module 34 computes a grayscale density $V_k$ of each part $D_k$ to acquire n grayscale densities $V_{k(k=1\sim n)}$, where n is a positive integer. The grayscale density $V_k$ of the part $D_k$ is computed using the following formula:

$$V_k = \frac{\sum r_{i'j'} \times g_{i'j'}}{\sum r_{ij} \times g_{ij}},$$

where (i' j') is a point in the part $D_k$, (i, j) is a point in the outline image, $r_{i'j'}$ represents a distance between the point (i', j') and the grayscale center($r_0$, $c_0$), $r_{ij}$ represents a distance between the point (i, j) and the grayscale center($r_0$, $c_0$), $g_{i'j'}$ represents a gray value of the point (i', j'), and $g_{ij}$ represents a gray value of the point (i, j). It may be appreciated that the n grayscale densities $V_{k(k=1\sim n)}$ are regarded as feature data of the image A.

In block S17, the feature data storage module 35 stores the feature data of the image A into the storage unit 6.

It may be appreciated that feature data of any other image, such as an image B, feature data of an image C, and so on, are further extracted using the method described.

Figure 5:
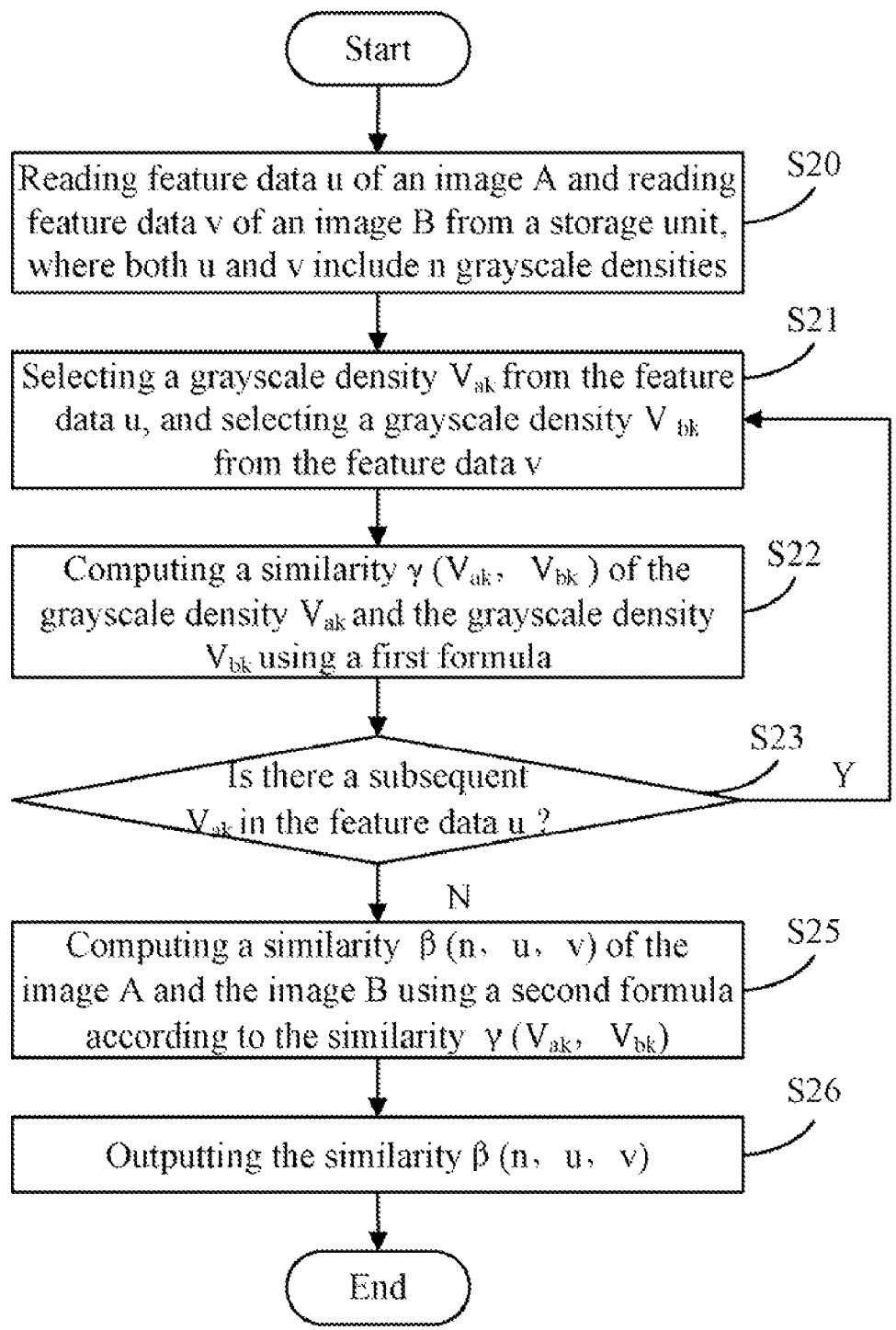
FIG. 5 is a flowchart of a method of matching images as disclosed, according to some embodiments of the present disclosure.

FIG. 5 is a flowchart of a method of matching images, performed by the processor 7 of the electronic device 1, according to some embodiments of the present disclosure. Depending on the embodiment, additional blocks in the flow of FIG. 5 may be added, others removed, and the ordering of the blocks may be changed.

In block S20, the feature data read module 40 reads feature data u of an image A and reads feature data v of an image B from a storage unit 6. Both the feature data u and the feature data v include n grayscale densities. That is, the feature data u includes grayscale densities $V_{ak(k=1\sim n)}$, and the feature data v includes grayscale densities $V_{bk(k=1\sim n)}$.

In block S21, the similarity computation module 41 selects a grayscale density $V_{ak}$ from the feature data u, and selects a grayscale density $V_{bk}$ from the feature data v.

In block S22, the similarity computation module 41 computes a similarity γ ($V_{ak}$, $V_{bk}$) of the grayscale density $V_{ak}$ and the grayscale density $V_{bk}$ using a first formula, for example:

$$\gamma(V_{ak}, V_{bk}) = 100 - |V_{ak} - V_{bk}| \div ((V_{ak} + V_{bk}) \div 2) * 100.$$

In block S23, the similarity computation module 41 determines if there is a subsequent $V_{ak}$ in the feature data u. Blocks S21 and S22 are repeated to compute n similarities γ ($V_{ak(k=1\sim n)}$, $V_{bk(k=1\sim n)}$), namely γ ($V_{a1}$, $V_{b1}$), γ ($V_{a2}$, $V_{b2}$), γ ($V_{a3}$, $V_{b3}$) ... γ ($V_{an}$, $V_{bn}$), if there is a subsequent $V_{ak}$ in the feature data u. Otherwise, block S25 is implemented if there is no subsequent $V_{ak}$ in the feature data u, namely, n similarities γ ($V_{ak(k=1\sim n)}$, $V_{bk(k=1\sim n)}$) have been computed.

In block S25, the similarity computation module 41 computes a similarity ẟ (n, u, v) of the image A and the image B according to the n similarities γ ($V_{ak(k=1\sim n)}$, $V_{bk(k=1\sim n)}$) using a second formula, for example:

$$\beta(n, u, v) = [\Sigma \gamma(V_{ak}, V_{bk})] \div n.$$

In block S26, the output module 42 outputs the similarity β (n, u, v) of the image A and the image B on the display unit 5.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method of extracting feature data of an image, the method being performed by a processor of an electronic device, the method comprising:
   (a) reading the image, wherein the image is a grayscale image;
   (b) computing a grayscale center of the image, wherein the grayscale center is a mean location of all the gray values in the image, where the grayscale center is computed by:

$$r_0 = \frac{\sum i \times g_{ij}}{\sum g_{ij}}$$
   $$c_0 = \frac{\sum j \times g_{ij}}{\sum g_{ij}},$$

wherein, ($r_0$, $c_0$) is the grayscale center, i represents each row of the image, j represents each column of the image, and $g_{ij}$ represents a gray value of the point (i, j) in the image;
   (c) dividing the image into n equal parts $D_{k(k=1\sim n)}$ according to the grayscale center, and computing a grayscale density $V_k$ of each part $D_k$ to acquire n grayscale densities $V_{k(k=1\sim n)}$, wherein n is a positive integer, wherein the grayscale density $V_k$ of the part $D_k$ is computed by:

$$V_k = \frac{\sum r_{i'j'} \times g_{i'j'}}{\sum r_{ij} \times g_{ij}},$$

wherein, (i' j') is a point in the part $D_k$, (i, j) is a point in the image, $r_{i'j'}$ represents a distance between the point (i', j') and the grayscale center($r_0$, $c_0$), $r_{ij}$ represents a distance between the point (i, j) and the grayscale center ($r_0$, $c_0$), $g_{i'j'}$ represents a gray value of the point (i', j'), and $g_{ij}$ represents a gray value of the point (i, j); and
   (d) regarding the n grayscale densities $V_{k(k=1\sim n)}$ as feature data of the image, and storing the feature data of the image into a storage unit of the electronic device.

2. The method as described in claim 1, wherein the image read in step (a) is acquired by a hardware component that captures images, or by a software application that downloads images from the Internet or a storage medium.

3. The method as described in claim 1, before (a) further comprising:
   converting the image into the grayscale image upon the condition that the image is a color image.

4. The method as described in claim 1, after (a) further comprising:
   determining outlines of the image to generate an outline image.

5. A method of matching images, the images comprising an image A and an image B, the method being performed by a processor of an electronic device and comprising:
   (a) computing a grayscale center of the image A, wherein the grayscale center is a mean location of all the gray values in the image A;
   (b) dividing the image A into n equal parts $D_{k(k=1\sim n)}$ according to the grayscale center of the image A, and computing a grayscale density $V_k$ of each part $D_k$ to acquire n grayscale densities $V_{k(k=1\sim n)}$, wherein n is a positive integer, and regarding the n grayscale densities $V_{k(k=1\sim n)}$ as feature data u of the image A;
   (c) repeating steps (a) to (b) to extract feature data v of the image B;
   (d) selecting a grayscale density $V_{ak}$ from the feature data u, and selecting a grayscale density $V_{bk}$ from the feature data v;
   (e) computing a similarity γ ($V_{ak}$, $V_{bk}$) of the grayscale density $V_{ak}$ and the grayscale density $V_{bk}$ using a first formula, wherein the first formula is:

$$\gamma(V_{ak}, V_{bk}) = 100 - |V_{ak} - V_{bk}| \div ((V_{ak} + V_{bk}) \div 2) * 100;$$

(f) repeating step (d) and (e) until there is no subsequent $V_{ak}$ in the feature data u, to compute n similarities γ ($V_{ak(k=1\sim n)}$, $V_{bk(k=1\sim n)}$);
   (g) computing a similarity β (n, u, v) of the image A and the image B according to the n similarities γ ($V_{ak(k=1\sim n)}$, $V_{bk(k=1\sim n)}$) using a second formula; and
   (h) outputting the similarity β (n, u, v) of the image A and the image B on a display unit of the electronic device.

6. The method as described in claim 5, wherein the second formula is:

$$\beta(n, u, v) = [\Sigma \gamma(V_{ak}, V_{bk})] \div n.$$

7. An electronic device, comprising:
   an image acquisition unit that acquires one or more images;
   at least one processor;
   a storage unit;
   one or more programs stored in the storage unit and executed by the at least one processor, the one or more programs comprising:
      an image read module to read an image from the image acquisition unit, wherein the image is a grayscale image;
      a grayscale center computation module to compute a grayscale center of the image, wherein the grayscale center is a mean location of all the gray values in the image, wherein the grayscale density $V_k$ of the part $D_k$ is computed by:

$$V_k = \frac{\sum r_{i'j'} \times g_{i'j'}}{\sum r_{ij} \times g_{ij}},$$

wherein, (i' j') is a point in the part $D_k$, (i, j) is a point in the image, $r_{i'j'}$ represents a distance between the point (i', j') and the grayscale center($r_0$, $c_0$), $r_{ij}$ represents a distance between the point (i, j) and the grayscale center ($r_0$, $c_0$), $g_{i'j'}$ represents a gray value of the point (i', j'), and $g_{ij}$ represents a gray value of the point (i, j);

a feature data extraction module to divide the image into n equal parts $D_{k(k=1\sim n)}$ according to the grayscale center, and computing a grayscale density $V_k$ of each part $D_k$ to acquire n grayscale densities $V_{k(k=1\sim n)}$, wherein n is a positive integer, wherein the grayscale density $V_k$ of the part $D_k$ is computed by:

$$V_k = \frac{\sum r_{i'j'} \times g_{i'j'}}{\sum r_{ij} \times g_{ij}},$$

wherein, (i' j') is a point in the part $D_k$, (i, j) is a point in the image, $r_{i'j'}$ represents a distance between the point (i', j') and the grayscale center ($r_0$, $c_0$), $r_{ij}$ represents a distance between the point (i, j) and the grayscale center ($r_0$, $c_0$), $g_{i'j'}$ represents a gray value of the point (i', j'), and $g_{ij}$ represents a gray value of the point (i, j); and a feature data storage module to regard the n grayscale densities $V_{k(k=1\sim n)}$ as feature data of the image, and store the feature data of the image into the storage unit.

8. The electronic device as described in claim 7, wherein the image acquisition unit is a hardware component that captures images, or a software application that downloads images from the Internet or a storage medium.

9. The electronic device as described in claim 7, wherein the one or more programs further comprise:

an image conversion module to convert the image read by the image read module into the grayscale image upon the condition that the image is a color image.

10. The electronic device as described in claim 7, wherein the one or more programs further comprise:

an outline determination module to determine outlines of the image to generate an outline image.

11. The electronic device as described in claim 7, wherein the one or more programs further comprise:

a feature data read module to read feature data u of an image A and read feature data v of an image B from the storage unit;

a similarity computation module to select a grayscale density $V_{ak}$ from the feature data u, select a grayscale density $V_{bk}$ from the feature data v, compute a similarity $\gamma$ ($V_{ak}$, $V_{bk}$) of the grayscale density $V_{ak}$ and the grayscale density $V_{bk}$ using a first formula, repeat selection and computation until there is no subsequent $V_{ak}$ in the feature data u, to compute n similarities $\gamma$ ($V_{ak(k=1\sim n)}$, $V_{bk(k=1\sim n)}$), and compute a similarity $\beta$ (n, u, v) of the image A and the image B according to the n similarities $\gamma$ ($V_{ak(k=1\sim n)}$, $V_{bk(k=1\sim n)}$) using a second formula; and an output module to output the similarity $\beta$ (n, u, v) of the image A and the image B on a display unit.

12. The electronic device as described in claim 11, wherein the first formula is:

$\gamma(V_{ak}, V_{bk})=100-|V_{ak}-V_{bk}|\div((V_{ak}+V_{bk})\div 2)*100.$

13. The electronic device as described in claim 11, wherein the second formula is:

$\beta(n, u, v)=[\Sigma\gamma(V_{ak}, V_{bk})]\div n.$

* * * * *